United States Patent
Cote et al.

[19]

[11] Patent Number: 6,131,280

[45] Date of Patent: Oct. 17, 2000

[54] METHOD OF REPAIRING A ROCKET THRUST CHAMBER

[75] Inventors: Louis W. Cote, Palm Beach Gardens; Thomas R. Hernacki, North Palm Beach; Michael R. Morton, Jupiter; Richard L. Rose, Port St. Lucie, all of Fla.

[73] Assignee: United Technologies Corporation, Hartford, Conn.

[21] Appl. No.: 09/201,476

[22] Filed: Nov. 30, 1998

[51] Int. Cl.⁷ .................................................. B21D 53/00
[52] U.S. Cl. ..................................... 29/890.01; 29/890.03; 29/527.2
[58] Field of Search ........................... 29/890.05, 890.02, 29/890.03, 527.2, 460, 890.054

[56] References Cited

U.S. PATENT DOCUMENTS

| | | | |
|---|---|---|---|
| 4,584,171 | 4/1986 | Niino et al. | 29/890.01 |
| 5,233,755 | 8/1993 | Vandendriessche | 29/890.01 |
| 5,249,357 | 10/1993 | Holmes et al. | 29/890.01 |
| 5,386,628 | 2/1995 | Hartman et al. | 29/890.01 |
| 5,473,817 | 12/1995 | Schnoor et al. | 29/890.01 |
| 5,477,613 | 12/1995 | Bales et al. | 29/890.01 |
| 5,546,656 | 8/1996 | Hartman et al. | 29/890.01 |

*Primary Examiner*—Irene Cuda
*Attorney, Agent, or Firm*—Christopher T. Hayes

[57] ABSTRACT

A method of making a rocket thrust chamber from an anomalistic tube bundle includes providing an anomalistic tube bundle including a plurality of tubes and a plurality of bonds, at least one of the bonds is discontinuous, defining a gap between one of the tubes and another of the tubes immediately adjacent thereto, filling the gap with a bridging material, the bridging material in the gap defining a patch, heating the tube bundle and the patch to a conditioning temperature, maintaining the conditioning temperature until the particles have become sintered and the binder material has vaporized, spraying molten metal onto the patch and the tube bundle outer shell until a predetermined thickness of the metal covers the tube bundle outer shell, and machining the predetermined thickness of metal to the predetermined dimensions of the structural jacket.

4 Claims, 3 Drawing Sheets

METHOD OF REPAIRING A ROCKET THRUST CHAMBER

FIELD OF THE INVENTION

This invention is related to rocket engines, and particularly to a process for repairing tube bundles used in making rocket engine thrust chambers.

BACKGROUND OF THE INVENTION

The demand for rocket engines capable of carrying payloads to space or near-Earth orbits continues to grow. However, engines such as those used to launch satellites are costly to design and manufacture. Consequently, manufacturers of such rocket engines are constantly seeking new ways to reduce the design and manufacturing costs of producing rocket engine components.

One such component is the rocket thrust chamber within which the propellants of the rocket engine are combusted and accelerated. Because of the extremely high temperatures of the propellants moving through the thrust chamber, the walls of the thrust chamber must be cooled in those applications that require sustained engine firings. Such cooling is typically accomplished by flowing a coolant through tubes that form the inner wall of the thrust chamber. Since the manufacture of such thrust chambers is costly, novel ways of manufacturing such thrust chambers have been developed.

One method of manufacturing such a thrust chamber is to braze a plurality of cooling tubes together to form of tube bundle onto which molten metal is sprayed to form a structural jacket. This method requires that any gaps between adjacent cooling tubes have been properly brazed so when the process of spring the molten metal occurs, none of the molten metal is allowed to infiltrate into gaps between adjacent cooling tubes. Should such infiltration occur, those adjacent tubes could become bonded together so rigidly that they are unable to expand and contract to the extent necessary to accommodate the thermal expansion that occurs during normal operation of the rocket thrust chamber. This could result in a useful life of the rocket thrust chamber that is less than the intended design life thereof.

Unfortunately, the process of brazing tubes to form tube bundle is a complex process, the success of which is highly dependent upon the tolerances to which the individual tubes have been manufactured. Slight variations and tube shapes can result in anomalies during the brazing cycle, causing one or more gaps occur in a braze that is supposed to be continuous. Attempts at additional brazing cycles to eliminate such gaps often fail to seal these gaps, and may cause gaps to occur in brazes that were continuous after the first brazing cycle. In those cases where the gaps cannot be eliminated, the tube bundle must be discarded, and a new tube bundle must be fabricated. As those skilled in the art will readily appreciate, discarding tube bundles that include these gap anomalies increases the overall cost of manufacturing rocket thrust chambers, and therefore the cost of manufacturing rocket engines.

What is needed is a method of making a rocket thrust chamber from a tube bundle that has one or more gap anomalies in a braze that is supposed to be continuous.

SUMMARY OF THE INVENTION

It is therefore an object of the present invention to provide a method for making a rocket thrust chamber from a tube bundle that has discontinuous bonds.

According to the method of the present invention, a method of making a rocket thrust chamber from an anomalistic tube bundle includes providing an anomalistic tube bundle including a plurality of tubes and a plurality of bonds, at least one of the bonds is discontinuous, defining a gap between one of the tubes and another of the tubes immediately adjacent thereto, filling the gap with a bridging material the bridging material in the gap defining a patch, heating the tube bundle and the patch to a conditioning temperature, maintaining the conditioning temperature until the particles have become sintered and the binder material has vaporized, spraying molten metal onto the patch and the tube bundle outer shell until a predetermined thickness of the metal covers the tube bundle outer shell, and machining the predetermined thickness of metal to the predetermined dimensions of the structural jacket.

The foregoing and other features and advantages of the present invention will become more apparent from the following description and accompanying drawings.

BEST MODE FOR CARRYING OUT THE INVENTION

Figure 1:
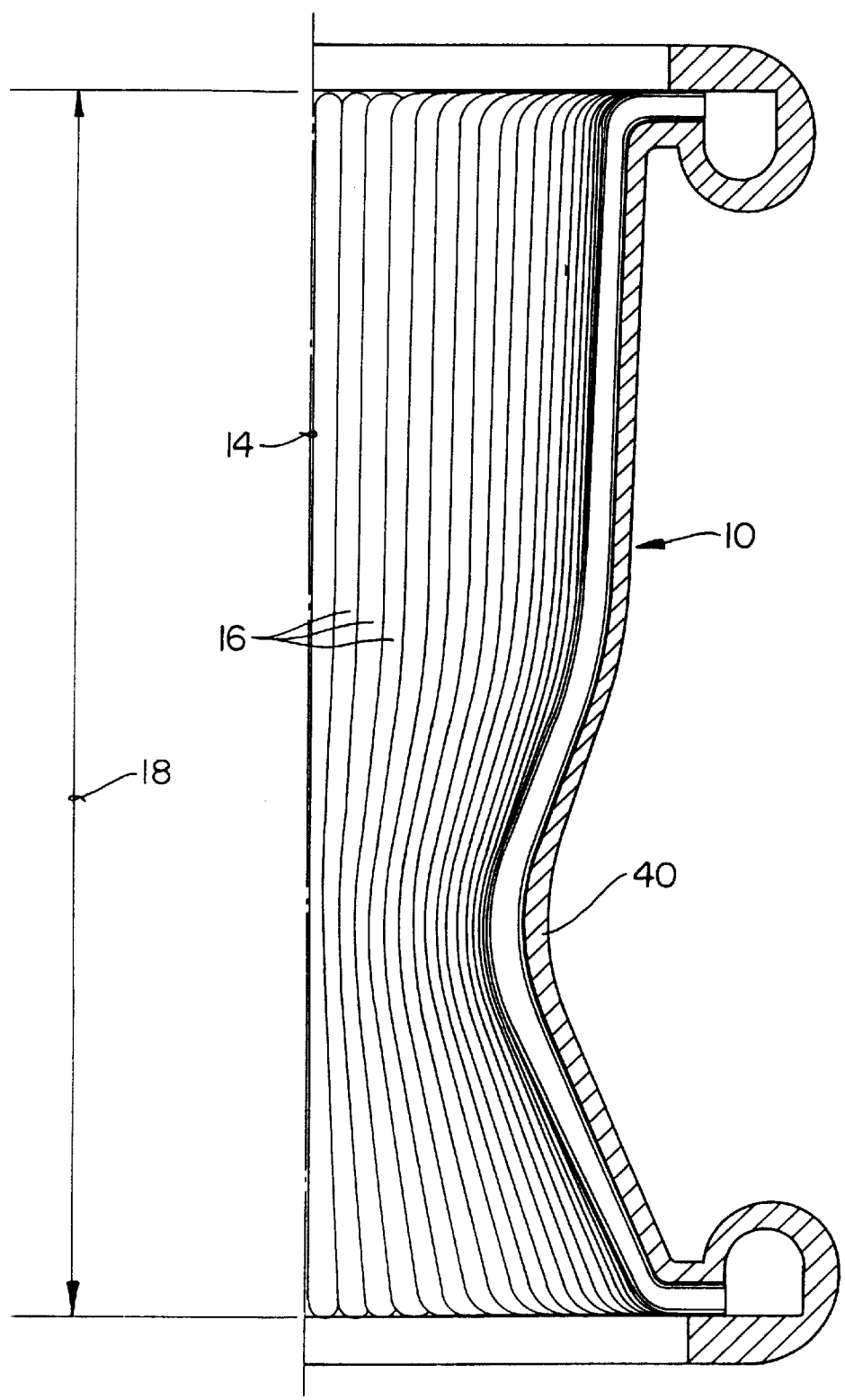
FIG. 1 is a cross-sectional view of a quarter section of the rocket thrust chamber that results from using the method of the present invention.

The method of the present invention is used to make a rocket thrust chamber 10, such as the one shown in the partial cross-sectional view of FIG. 1, from an anomalistic tube bundle. As used herein, the term "anomalistic tube bundle" means a tube bundle in which some of the bonds that are supposed to be continuous between adjacent tubes, are discontinuous. Where the bonds are discontinuous, a gap is present between adjacent tubes. These gaps can interfere with the manufacture of the rocket thrust chamber, resulting in a rocket thrust chamber which may fail during testing, or may experience a reduced life as a result of the anomalistic tube bundle. The method of the present invention is particularly useful in the manufacture of rocket thrust chambers by a process commonly to as Vacuum Plasma Spray ("VPS") by those skilled in the art.

Figure 2:
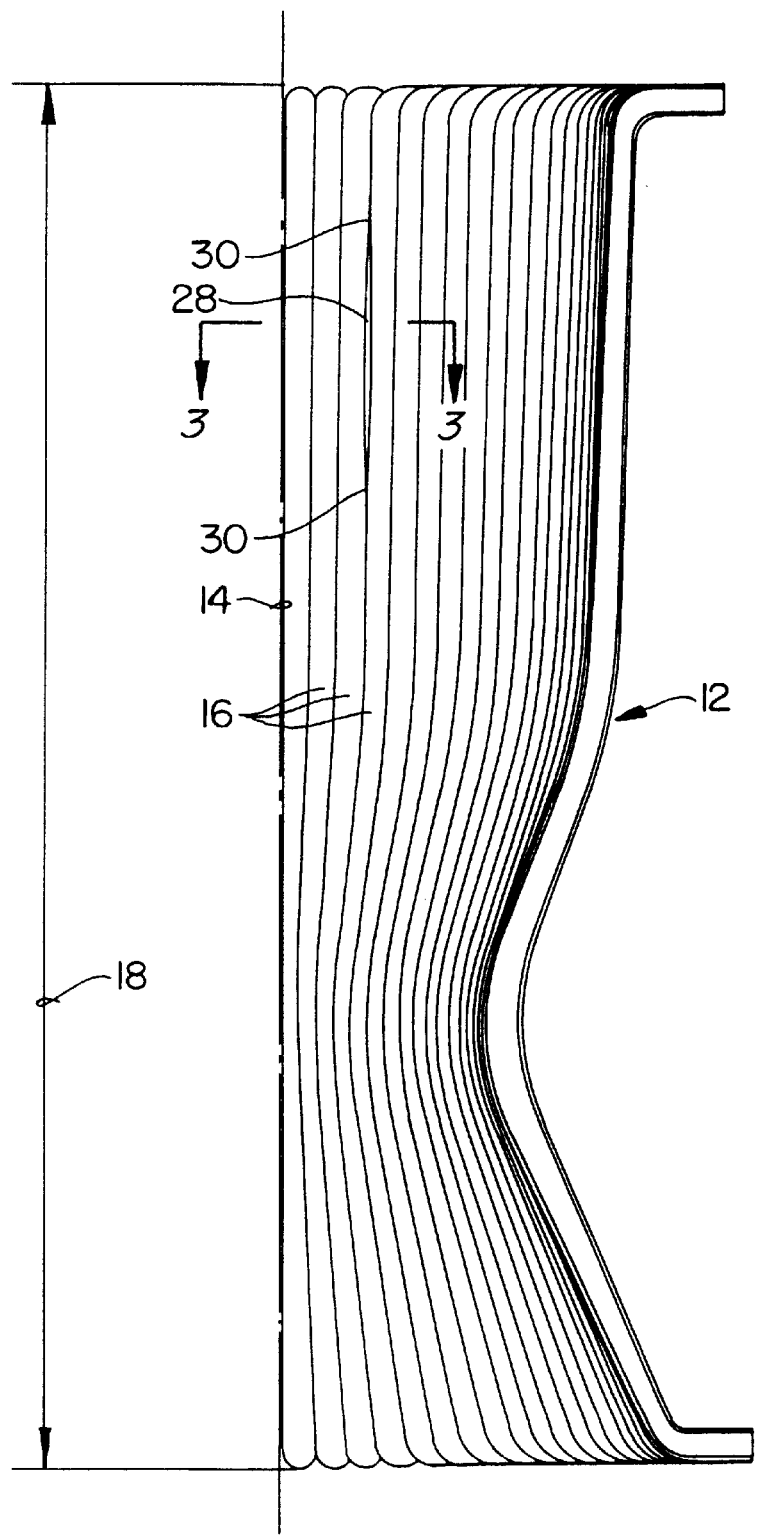
FIG. 2 is a cross-sectional view of a quarter section of the tube bundle used in the method of the present invention.

A tube bundle 12 of the type used in the method of the present invention is shown in FIG. 2. It is to be understood that FIG. 2 shows only one-fourth (¼) of the tube bundle 12, and that the entire tube bundle 12 is symmetric about a longitudinally extending reference axis 14. The tube bundle 12 includes a plurality of cooling tubes 16 that are circumferentially located about the longitudinally extending reference axis 14. The longitudinal axis 14 defines the axis of symmetry for the tube bundle 12, and, as shown in FIG. 2, each of the tubes 16 extends along the longitudinal axis 14 in spaced relation thereto.

Figure 3:
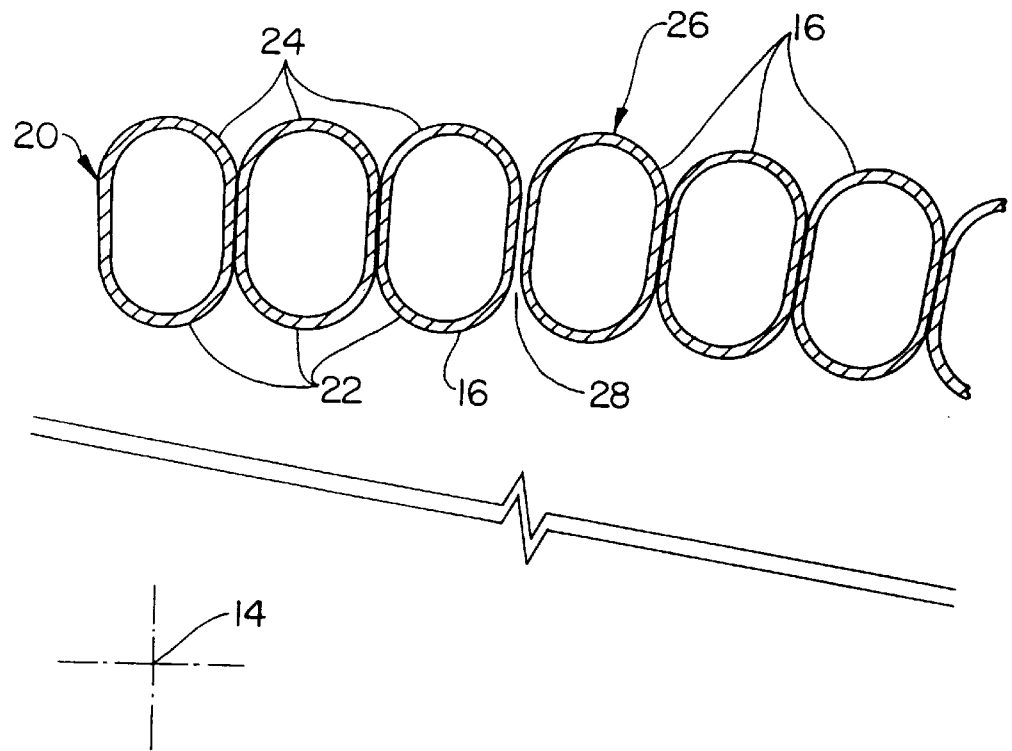
FIG. 3 is a cross-sectional view of the tube bundle taken along line 3—3 of FIG. 2 and showing the gap in the braze.

In a typical tube bundle 12, each of the tubes 16 is bonded to two of the tubes 16 immediately adjacent thereto along the entire length 18 that the tubes 16 extend along the longitudinal axis 14. This bonding, which is preferably accomplished by brazing, fills the interstices between adjacent tubes 16, thereby preventing the spray of molten metal from infiltrating into the interior of the tube bundle 12 during the VPS forming process described below. As shown in FIG. 3, the outer surface 20 of each of the tubes 16 comprises a radially inward portion 22 and a radially outward portion 24, relative to the longitudinal axis 14. The radially inward portion 22 of each tube 16 faces the longitudinal axis 14, and the radially outward portion 24 of each tube 16 faces away from the longitudinal axis 14. Collectively, the radially outward portions 24 define the tube bundle outer shell 26.

As shown in FIGS. 2–3, the anomalistic tube bundle 12 includes at least one gap 28 between adjacent tubes 16 that are supposed to be bonded together. This gap 28, which occurs because the bond 30 on either side of the gap 28 is discontinuous, provides a potential pathway for molten metal to intrude into the tube bundle 12 and fill the gap 28 during the VPS forming process. If that should occur, the tubes 16 immediately adjacent the gap 28 may become rigidly bonded to each other, thereby restricting the ability of those tubes 16 to expand and contract in response to temperature changes within the thrust chamber 10 caused by intermittent firing of the rocket engine during operation thereof. If the ability of the tubes 16 to expand and contract is sufficiently restricted, stress in one or more of the tubes 16 may cause that tube 16 to fail during operation of the rocket thrust chamber 10.

The method of the present invention includes preparing bridging material comprising a mixture of a curable binder material, such as NICROBRAZ™ (a trademark of the Wall Colmonoy Corporation's brand of binder cement, and particles of the parent metal that the tubes are made of. Preferably, the tubes 16 (and therefore the particles) are made of copper or a copper alloy, due to copper's excellent heat transfer characteristics. Importantly, the curable binder material is subject to vaporization at temperatures above a vaporization temperature that is greater than the sintering temperature at which the particles of the parent metal are subject to sintering.

Figure 4:
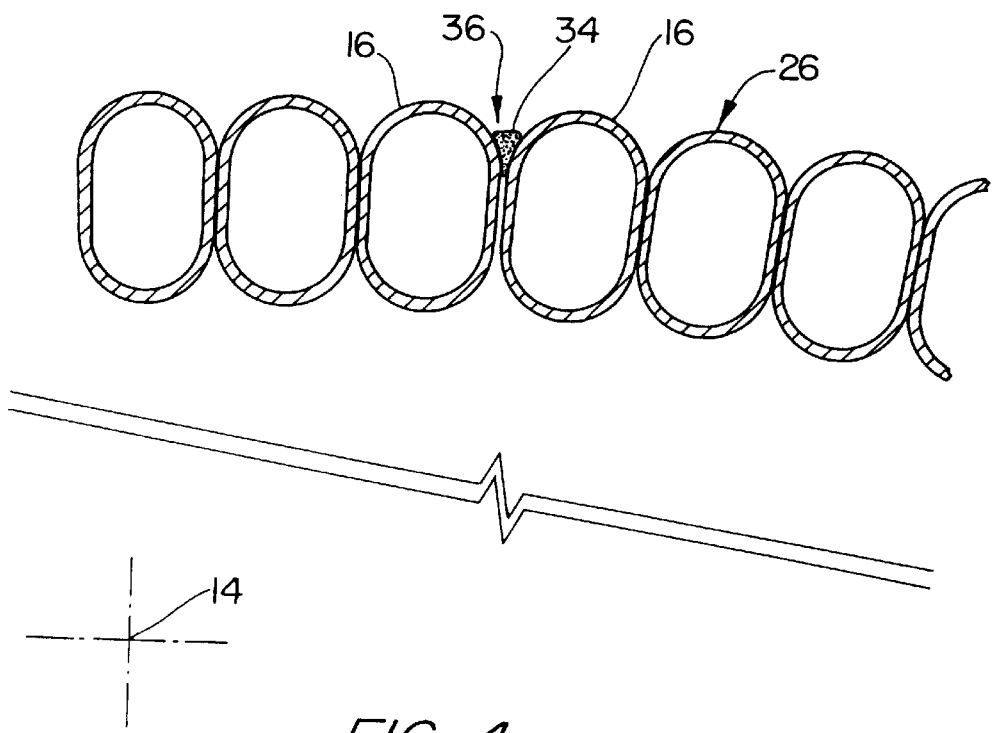
FIG. 4 is the cross-sectional view of FIG. 3 showing the bridging material patch sealing the gap.

In order to obtain acceptable sintering of the particles, the particles should comprise at least 50 percent of the volume of the bridging material, and in the preferred embodiment of present invention, the particles are spherical. The curable binder material and the particles are mixed together to form a paste-like mixture, which is the bridging material. This bridging material 34 is placed into the gap 28 in the outer shell 26, filling the gap 28 with the bridging material 34, as shown in FIG. 4.

The bridging material 34 is applied only to seal between the adjacent tubes 16, not onto the outer shell 26. The bridging material 34 in the gap 28 defines a patch 36 which covers the gap 28 and provides a barrier to infiltration of molten metal into the gap 28 during the VPS process. The bridging material 34 is then cured, and then the tube bundle 12 and the patch 36 are heated to a conditioning temperature that is greater than the vaporization temperature.

The temperature of the tube bundle 12 and the patch 36 are maintained at the conditioning temperature until the particles have become sintered and the binder material has vaporized. This results in a loosely consolidated, sintered barrier of parent metal for the molten metal to impact upon during the VPS process. Molten metal, such as steel or a steel alloy, is then sprayed onto the patch 36 and the tube bundle outer shell 26 using the VPS process known in the art, until a predetermined thickness of metal covers the tube bundle outer shell 26.

As the molten metal impacts the patch 36, the metal builds up, but does not intrude into the gap 26 between the tubes 16. Once the sprayed metal has reached the desired thickness, additional processing (e.g. heat treatment) is performed to produce the desired material characteristics in the sprayed metal. After the additional processing has been completed, the predetermined thickness of metal is machined to the predetermined dimensions of a structural jacket 40, yielding the rocket thrust chamber 10 shown in FIG. 1.

As those skilled in the art will readily appreciate, the resulting rocket thrust chamber 10 has the flexibility to allow the tube bundle 12 to expand in contract with its environment, which would not have been the case if the molten metal had infiltrated into the gap 26 and rigidly bonded the adjacent tubes 16 together. The local sintering effect is loose enough to allow the sintered particles to be removed, if desired. Otherwise, the sintered particles can remain in place, and will fall out in the event that high expansion occurs across the gap 26 during operation of the rocket thrust chamber 10. The presence, or absence, of the sintered particles does not affect the operation of the rocket thrust chamber 10; the sintered particles are only needed to form the barrier patch 36 during the VPS process.

Although this invention has been shown and described with respect to detailed embodiments thereof, it will be understood by those skilled in the art that various changes in form and detail thereof may be made without departing from the spirit and scope of the claimed invention.

We claim:

1. A method of making a rocket thrust chamber from an anomalistic tube bundle, said method comprising:

providing an anomalistic tube bundle including a plurality of tubes and a plurality of bonds, said tubes made of a parent metal, said tube bundle having a longitudinal axis defined therethrough, each of said tubes extending along said longitudinal axis in spaced relation thereto, each of said tubes is bonded to two of said tubes immediately adjacent thereto by said bonds, at least one of said bonds is discontinuous, defining a gap between one of the tubes and another of said tubes immediately adjacent thereto, the outer surface of each of said tubes comprises a radially inward portion and a radially outward portion, the radially inward portion of each tube faces said axis and the radially outward portion of each tube faces away from said axis, said radially outward portions collectively defining an tube bundle outer shell;

preparing a bridging material comprising a mixture of a curable binder material and particles of the parent metal, said curable binder material subject to vaporization above a first predetermined temperature, said particles of parent metal subject to sintering above a second predetermined temperature, said first predetermined temperature is greater than said second predetermined temperature;

sealing said gap with the bridging material, said bridging material in said gap defining a patch;

heating the tube bundle and the patch to a conditioning temperature, said conditioning temperature greater than the first temperature;

maintaining said conditioning temperature until said particles have become sintered and said binder material has vaporized;

spraying molten metal onto the patch and the tube bundle outer shell until a predetermined thickness of said metal covers said tube bundle outer shell; and, machining said predetermined thickness of metal to the predetermined dimensions of the structural jacket.

2. The method of claim 1 wherein said particles are spherical.

3. The method of claim 2 wherein said parent metal is a copper alloy.

4. The method of claim 3 wherein said molten metal is a steel alloy.

* * * * *